United States Patent Office 3,129,211
Patented Apr. 14, 1964

3,129,211
POLYMERIZATION CATALYST AND PROCESS
Gordon D. Brindell and Allan J. Lundeen, Ponca City, Okla., assignors to Continental Oil Company, Ponca City, Okla., a corporation of Delaware
No Drawing. Filed Nov. 5, 1959, Ser. No. 851,022
4 Claims. (Cl. 260—94.9)

This invention relates to novel catalyst and process for the preparation of low density, high molecular weight polyethylene polymer. In one aspect it relates to catalyst comprising a very high ratio of organometal compound to metal halide and polymerization process utilizing said catalyst.

It is well known in the art to polymerize ethylene to solid polymers in the presence of catalyst comprising organometals and transition metal halides, employing a low mole ratio of organometal to metal halide. Recently improved polymers of extreme linearity, relatively low density and very high molecular weight have been discovered. These polymers are described in the co-pending application of David W. Marshall, Serial No. 851,019, filed November 5, 1959, and now abandoned. This invention relates to new and improved organometal-transition metal halide catalyst and method for the preparation of the polymers of Serial No. 851,019.

It is an object of this invention to provide improved catalyst and process for the polymerization of ethylene.

It is another object of this invention to provide improved catalyst and process of the polymerization of ethylene to polymers of low density and high molecular weight.

Still another object of this invention is to provide improved catalyst comprising an organometal compound and transition metal halide for the polymerization of ethylene.

These and other objects of the invention will become more readily apparent from the following detailed description and discussion.

The foregoing objects are realized broadly by providing a catalyst composition comprising an organometal compound and a transition metal halide, present in a ratio of at least about 30 moles of organometal compound per mole of transition metal halide.

In one aspect of the invention the catalyst comprises a hydrocarbon soluble metal halide.

The catalysts of the present invention comprise generally the conventional transition metal halide polymerization catalysts. It is well known in the art that the various transition metal halides, for example, chlorides, bromides, etc., of the metals of groups III, IV, V, VI, VII and VIII of the periodic table are active in the polymerization of ethylenically unsaturated polymerizable monomers, and particularly low molecular weight mono-olefins such as ethylene. The halides of the metals of groups IV-A, V-A and VI-A are especially active in polymerization, particularly the halides of titanium, zirconium, vanadium, chromium, and molybdenum. A very effective catalyst and the preferred one of this invention is titanium tetrachloride.

A wide variety of organometal compounds can be employed in combination with the transition metal halide. These compounds include alkyl, cycloalkyl, aryl and alkaryl derivatives of various metals particularly alkali metals of groups I-A of the periodic table and metals of groups II-A, II-B and III-A, IV-B, V-B, etc., including titanium, aluminum, beryllium, zinc, indium, gallium, magnesium, boron, etc. Particularly useful organometals are the alkali metal alkyl compounds and alkali metal alkaryl compounds, which include specifically materials such as amyl sodium, parasodio tertiary butyl benzene, phenyl sodium, etc.

Specific examples of catalyst systems which can be employed in this invention include titanium tetrachloride and triethyl aluminum, amyl sodium and titanium tetrachloride, phenyl sodium and zirconium tetrachloride, zinc diethyl and titanium tetrachloride, phenyl lithium and titanium tetrachloride, and the like.

Generally the polymerization reaction is carried out in the presence of a liquid diluent which serves as a carrier for the catalyst, as a heat sink for polymerization temperature control and as a diluent for the polymer product. The diluent, which is usually a hydrocarbon can be any material ordinarily employed in polymerization catalyst systems comprising an organometal compound and a transition metal halide. Specific diluents include paraffins such as butane, pentane, hexane, heptane, etc., cycloparaffins such as cyclohexane, cyclopentane, methyl cyclopentane, and the like. Usually the diluent is selected from compounds containing from about 6 to about 12 carbon atoms.

The polymerization reaction conditions, for example, temperature, pressure, time, etc., employed in the polymerization reaction vary depending on the composition of the polymerization catalyst. In general the reaction conditions correspond to those which are well known in the art and can be varied as required for the particular polymerization system. For convenience low temperatures in the order of 50 to 100° C. are ordinarily employed, however, more elevated temperatures up to as high as 200° C. can be used if desired. The reaction pressure is not critical and usually is determined only by the limitations of the equipment employed. The reaction time can also vary widely and is established primarily by the degree of conversion desired.

Various methods of combining the catalyst components can be employed however, generally the catalyst is prepared by suspending or dissolving the organometal compound in a hydrocarbon diluent such as previously described. Thereafter the metal halide, for example, titanium tetrachloride is added to the admixture of organometal compound and diluent. The ratio of catalyst components in the catalyst system can be varied substantially, however, an excess of the organometal compound is necessary to provide a mole ratio of said compound to metal halide of at least about 30:1 and up to as high as 400:1. Although higher ratios than 400:1 can be used, in practice it is desirable to keep the ratio relatively low since the amount of polymer formed in the polymerization reaction is proportional to the amount of titanium present in the catalyst.

While, in general, any of the metal halide polymerization catalyst can be employed in the catalyst composition of the invention, preferably the hydrocarbon soluble halides are used since these halides provide a catalyst system in which improved contacts is obtained between the catalyst components.

The polymers which are prepared from the catalyst of this invention are characterized by their extreme linearity, relatively low unannealed density (0.928–0.935 at 23° C.) and extremely high molecular weight (over one million). They have very high tensile strength and are substantially insoluble in hydrocarbon solvents, both aliphatic and aromatic.

The following examples are presented in illustration of the invention:

EXAMPLE 1

A series of runs was carried out in which a one gallon pressure reactor was charged with two liters of dry normal hexane and a catalyst mixture made up of mixed alkyl sodiums (octyl and amyl) and titanium tetrachloride, the components of the catalyst mixture being present in different amounts in different runs. The reactor was heated to 75° C. and pressured to 150 p.s.i.g.

with ethylene. In each run the reaction time was two hours and at the end of this time the contents of the reactor were emptied into methanol to decompose residual catalyst. The polymer was then dried in a vacuum oven and tested to determine its various properties.

A control run was also carried out in the same reactor with the following differences in procedure, (1) 2.5 liters of dry normal hexane, (2) 100° C. reaction temperature, (3) 400 p.s.i.g. reaction pressure.

The properties of the polymers obtained in the various runs are set forth in Table I.

reason thereof and that many variations and modifications are within the scope of the invention.

We claim:
1. A composition consisting essentially of an organo-sodium compound and titanium tetrachloride characterized in that the mole ratio of organo-sodium to titanium tetrachloride is from about 30:1 to about 400:1.
2. A composition consisting essentially of amyl sodium and titanium tetrachloride, characterized in that the mole ratio of amyl sodium to titanium tetrachloride is from about 30:1 to about 400:1.

Table I

| Run No. | R Na,[1] moles | TiCl4, moles | Na R TiCl4 | Reaction temperature, ° C. | Ethylene pressure, p.s.i.g. | Reaction time, hrs. | Yield, g. | Percent ash [2] | Density at 23° C.[3] | Initial melting point, ° C.[4] | Remelt point, ° C.[5] | Tensile strength, p.s.i.[6] | Elongation, percent [7] | Solubility in tetralin, 130° C.[8] | Branches, 1,000 carbons [9] |
|---|---|---|---|---|---|---|---|---|---|---|---|---|---|---|---|
| H I-117 (Control) | 0.47 | 0.2 | 2.35 | 100 | 400 | 2 | 131 | 0.99 | 0.949 | | 124-130 | 4,235 | 480 | Soluble [10] | 1— |
| HH II-115 | 0.1 | .0005 | 200 | 75 | 150 | 2 | 21 | 0.71 | 0.935 | 199-200 | 125-134 | ([11]) | ([11]) | Insoluble | |
| HH II-116 | 0.1 | .00025 | 400 | 25 | 150 | 2 | 21 | 0.67 | 0.932 | 191-198 | 127-133 | ([11]) | ([11]) | ---do------ | |
| HH II-117 | 0.1 | .001 | 100 | 75 | 150 | 2 | 107 | 0.19 | 0.931 | 190-193 | 127-134 | 6,810 | 235 | ---do------ | |
| HH II-119 | 0.1 | .001 | 100 | 25 | 150 | 2 | 115 | 0.50 | 0.929 | 190-193 | 127-133 | 7,150 | 210 | ---do------ | 1— |
| HH II-120 | 0.1 | .002 | 50 | 75 | 150 | 2 | 302 | 0.27 | 0.933 | 189-192 | 128-134 | 6,250 | 350 | ---do------ | |
| HH II-121 | 0.1 | .002 | 50 | 25 | 150 | 2 | 300 | 0.11 | 0.928 | 186-189 | 128-135 | 7,045 | 200 | ---do------ | 1+ |

[1] Mixed alkyl sodiums (octyl and amyl).
[2] The granular polymer is heated in a muffle furnace at 575° C. until the inorganic ash attains constant weight.
[3] ASTM D792-50.
[4] The granular polymer is observed through a microscope equipped with a hot stage using polarized light. The initial melting point or better, initial melting range, is the temperature where birefringence of the particles starts to disappear and where it has completely disappeared.
[5] The apparatus is the same as above. After the initial melting, the polymer is allowed to cool and crystallize. The remelt range is the beginning and end of disappearance of birefringence.
[6] ASTM D638-58-T 20'' min. crosshead speed.
[7] ASTM D638-58T.
[8] This was actually to be a molecular weight determination by ASTM D-1601-58T using tetrahydronaphthalene. The polymers all proved insoluble and molecular weights could not be run.
[9] An infrared method, see W. D. M. Bryant and R. C. Voter, J. Am. Chem. Soc., 75, 6113 (1953).
[10] Molecular weight (number average) was 525,000.
[11] Insufficient sample for test.

NOTE.—The polymers prepared with the catalyst of this invention are characterized by their extreme linearity and relatively low density. They also have lower elongation and substantially greater tensile strength than the polymer of the control run.

EXAMPLE 2

Two runs were carried out in a one quart low pressure reactor in which the reactor was charged with 500 milliliters of dry normal hexane and a catalyst mixture composed of aluminum triethyl and titanium tetrachloride. The molar ratio of catalyst components differed in each run. The reactor was pressured to 40 p.s.i.g. ethylene pressure to produce polymerization. At the end of the polymerization period, the catalyst was decomposed with methanol and the polymer was washed with a solution of hydrogen chloride in methanol to remove residue catalyst. The polymer product had some solubility in Tetralin at 130° C. but the solution was too viscous to measure molecular weight. A control run was also carried out under the same reaction conditions.

Properties of the polymer product are given in Table II.

3. A process for the preparation of low density, high molecular weight polyethylene which comprises contacting ethylene under polymerization conditions with a catalyst consisting essentially of an organo-sodium compound and a titanium tetrachloride characterized in that the mole ratio of organo-sodium to titanium tetrachloride is from about 30:1 to about 400:1.

4. A process for the preparation of low density, high molecular weight polyethylene which comprises contacting ethylene under polymerization conditions with a catalyst consisting essentially of amyl sodium and titanium tetrachloride, characterized in that the mole ratio of amyl sodium to titanium tetrachloride is from about 30:1 to about 400:1.

Table II

| Run No. | AlEt3, moles | TiCl4, moles | AlEt3/TiCl4 | Temperature, ° C. | Ethylene Pressure, p.s.i.g. | Yield, g. | Percent, Ash [1] | Density, 23° C.[2] | Tensile Strength, p.s.i.[3] | Percent Elongation [4] |
|---|---|---|---|---|---|---|---|---|---|---|
| DWM III-71 | .014 | .00028 | 50 | 25 | 40 | 41 | 0.07 | 0.930 | 5,835 | 250 |
| DWM III-72 | .014 | .00014 | 100 | 25 | 40 | 22 | 0.11 | 0.931 | 5,510 | 200 |
| DWM III-96 (Control) | 0.021 | 0.007 | 3 | 25 | 40 | 39 | | 0.955 | 4,080 | 480 |

[1] Same as in Example 1. [2] Same as in Example 1. [3] Same as in Example 1. [4] Same as in Example 1.

In this series of runs, as in Example 1, the catalyst of the invention produces a polymer having substantially different properties from the product obtained with the conventional catalyst.

Having thus described the invention by providing specific examples thereof, it is to be understood that no undue limitations or restrictions are to be drawn by

References Cited in the file of this patent

UNITED STATES PATENTS

| 2,867,612 | Pieper et al. | Jan. 6, 1959 |
| 2,886,561 | Reynolds et al. | May 12, 1959 |
| 2,924,594 | Breslow | Feb. 9, 1960 |

FOREIGN PATENTS

| 533,362 | Belgium | May 16, 1955 |